March 6, 1956     E. W. S. NICHOLSON     2,737,479
STAGED SEPARATION AND STABILIZATION OF OIL
CONVERSION PRODUCTS AND APPARATUS THEREFOR
Filed July 27, 1953
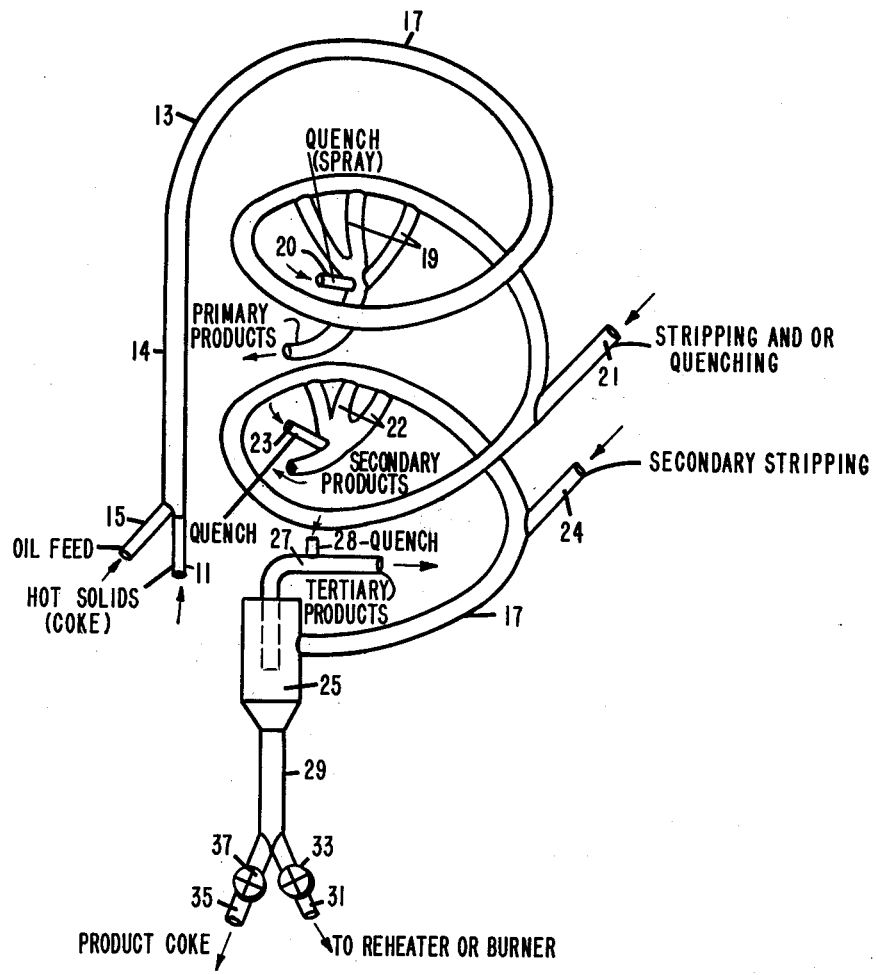
EDWARD W. S. NICHOLSON     INVENTOR
BY *Edwin M. Thomas*     ATTORNEY

United States Patent Office 2,737,479
Patented Mar. 6, 1956

2,737,479

STAGED SEPARATION AND STABILIZATION OF OIL CONVERSION PRODUCTS AND APPARATUS THEREFOR

Edward W. S. Nicholson, Baton Rouge, La., assignor to Esso Research and Engineering Company, a corporation of Delaware Application July 27, 1953, Serial No. 370,281

15 Claims. (Cl. 196—55)

The present invention relates to the staged separation and stabilization of oil conversion products and apparatus therefor. More particularly the invention relates to a process and apparatus for separating and promptly stabilizing gasiform products such as hydrocarbon vapors and the like from entrained particles of finely divided solids. The invention has special application to the separation of the reaction products obtained in the high temperature coking of heavy hydrocarbon oils from entrained solid particles, although it is not necessarily limited thereto.

As is well known in the art, various attempts have been made in the past to convert heavy hydrocarbon oils, such as residual petroleum fractions and heavy crudes to more valuable products. Two general types of conversion processes have been proposed, based upon the type of product desired. One of these is a process for the conversion, at moderately high temperatures, of heavy oils primarily to gasoline, gas oil, and other hydrocarbon products of lower viscosity and boiling range than the feed. The other type of process relates to the conversion, at relatively higher temperatures, of similar feeds with the object, however, of making products such as olefins, diolefins, acetylene, aromatics such as benzene, toluene, styrene, etc., which are generally referred to broadly as chemicals or chemical raw materials. Thus, by thermally cracking heavy oils, especially residua, at very high temperatures, usually above 1200° F. to 1300° F. or so, and up to 1500° F. or more, substantial proportions of these chemical raw materials are produced. These materials, per se, are useful as starting materials for production of various special products of commerce, including polymers, plastics, resins, fine chemicals, etc., and are in considerable demand. They may be produced by contacting the oil feed with very hot catalytically inert solid particles, such as small coke particles, for very brief periods of time. The present process and apparatus are particularly suitable for use in the production of such chemicals or chemical raw materials, although not necessarily limited thereto. Acetylene, ethylene, propylene, butylenes, butadiene, amylenes, isoprene, and aromatics including benzene, toluene, and styrene are among the products that can be produced in this general process.

It has also been proposed in the prior art to effect the conversion or coking of heavy residual hydrocarbon oils to chemicals, as well as to motor fuels and other products, by contacting the heavy oil, preferably preheated, with a mobile stream or mass of hot finely divided solid particles. These not only furnish the necessary heat for cracking and conversion but they also assist in dispersion of the feed to increase the rate and extent of the conversion reaction. Various proposals have been made for cracking or coking residual oils in this general manner. For instance, a mass of finely divided particles of coke, e. g. of about 40 to 400 microns average particle diameter, which are relatively inert catalytically, may be heated to a high temperature, for example to 1100 to 1600° F., more or less, and used as heat carriers to convert heavy oils by thermal cracking. Such particles may be used in the form of a moving mass or bed or a fluidized bed, or they may be used as a dispersion fed through a conduit or transfer line while the conversion takes place. In either case the oil, usually in liquid phase, is contacted intimately with the hot particles. It is rapidly heated by such contact and is very quickly vaporized and/or cracked or converted to lower boiling products or chemicals. The time required for conversion is very short, frequently of the order of small fractions of a second.

Particularly in the conversion of heavy oils to chemicals such as those mentioned above it is essential that heat be applied to the oil at a very high temperature but for only a very short period of time. If the heating is prolonged, the reactive chemicals which are formed tend rapidly to crack, polymerize or otherwise to degrade to less valuable materials. Thus in coking heavy residual oils to produce chemicals, for example, it is desirable to heat the oil to a reaction temperature usually within the range of 1000–1600° F. and preferably within the range of 1300 to 1500° F. for only a very short time, as compared with the conversion of a similar feed to motor fuel or gas oil. The time will vary with the temperature, and with the type of oil feed and the reaction desired. In general, conversion to ethylene and other low molecular weight olefins at temperatures of the 1100 to 1500° F. range takes place within 0.05 to about 2 seconds. Usually the time limit is between 0.2 and 1 second. In some cases time is even shorter. Different feeds vary considerably in their refractory properties. As soon as the desired conversion has taken place it is important to quench the reaction products immediately. This may be done by quenching very quickly reaction products withdrawn from the main stream of solids and gases. The latter is preferable where the solids are to be circulated and reheated. In quenching the temperature of the products should be substantially reduced, by at least 100° F. and usually more.

Since operations of the type described above are usually carried out in equipment designed for handling finely divided solid particles and hydrocarbon vapors, etc., separation of solids and vapors has usually been accomplished after withdrawal from the reaction zone by means of more or less conventional cyclone type separators. Although these cyclones are very efficient separators, they permit prolonged contact between part of the product vapors and the solid particles. The delay in time from reactor to cyclone also is highly detrimental, as well as delay in the cyclone itself. In a standard cyclone of well known design, the solid particles are thrown by centrifugal force to an outer wall of the cyclone and the particles gradually slide down the wall by gravity into an outlet. Their rate of movement in such sliding is relatively slow. During their movement the solids are constantly in contact with gases and vapors from which they are eventually to be separated. Moreover, they hold some of the products by adsorption and desorption is relatively slow. Under these conditions considerable degradation of the vapor products occurs within the cyclone as well as in its inlet and outlet.

An object of the present invention is to accomplish the separation and especially the quenching of the highly reactive conversion products very quickly after the conversion reaction takes place so as to prevent this degradation. A further object is to provide for the withdrawal of secondary conversion products and products which are desorbed from the solids at a later stage, after the withdrawal of primary conversion products.

For example, in an operation designed for the conversion of heavy reduced crude petroleum oil to ethylene, propylene, butadiene, and other low molecular weight chemical raw materials, the oil may be contacted with hot solid particles (1100 to 1500° F.) for a time period of 0.05 or 0.1-2 seconds. The ethylene or related products should be removed from contact with the solids and should be quenched to a considerably lower temperature almost instantaneously at the end of this contact period.

After separation of the primary products from the stream of solids, some gaseous and vaporous products are needed to carry the solids away from the point of separation. A minor portion of the conversion products is always passed on in adsorption with the solids. According to the present invention, a stripping gas or vapor such as steam may be introduced into the system after the solid particles have passed the point of primary product withdrawal. This may be also a material which assists in quenching the adsorbed products. Thus a cool vapor or in some cases a liquid or even a stream of finely divided solids, of substantially lower temperature than the products, may be introduced at the stripping point or points to quench the secondary products quickly and prevent further degradation. This stripping operation, which results in recovery of secondary products, is preferably followed by another step of withdrawing the gaseous and vaporous components from contact with the solid particles. A second stripping operation, with a subsequent withdrawal of a third product stream, may be provided when needed.

According to the present invention, both the primary and the secondary separation steps are carried out by passing the stream of gaseous and vaporous reaction products together with entrained solid particles, along a curvilinear path, preferably a spiral path. The path, whether plane curved or spiral curved, is preferably at least a part of the reactor system and it may comprise the whole reactor in some cases. The separated vapor products are withdrawn and immediately quenched. The latter is very important. More specifically, the solid materials and the conversion products are moved at a high velocity along the spiral path so that centrifugal force will throw the bulk of the solids to the outer periphery of the path, thus largely separating the particles from the gases and vapors. Obviously, complete separation is not achieved because some of the solids slide along and around the conduit wall. Moreover, part of the gases and vapors are adsorbed to the solids and a small quantity must continue to propel the solids particles and prevent them from collecting and closing off the vapor outlet passage.

The primary products, fairly well freed of solid particles, are withdrawn from an inner portion of the curved or spiral path in a direction directed generally toward the center of curvature or the axis of the spiral. The curved or spiral path should be continued preferably for a duration of at least one complete rotation about its axis. Preferably the axis is vertical and the flow is downward in a more or less spiral path about a vertical line representing the axis. It may be upwardly, however, or around a non-vertical axis. The primary products are withdrawn at the earliest possible stage in the spiral path, that is, as soon as reaction is complete and a substantial part of the solids have been effectively separated. After this separation, the quench material is introduced downstream from the point of withdrawal, e. g. in the side line, by spraying in a cool liquid or passing through an efficient heat exchanger. Secondary products are separated, also in a continuing portion of the spiral path, as soon as practicable after disengaging them from the solids. In the embodiment of the invention shown in the attached drawing, the solids are carried further, beyond the point where secondary products are withdrawn, to a conventional separator where they are collected and passed onwardly to a receiver or a reheater. A sufficient stream of gas or vapor is continued through the system at all times to carry the solid particles out of the spiral path and into the final gas-solids separator. As shown herein, the final or conventional separator may be a cyclone of standard design.

Referring more particularly to the attached drawing, an embodiment of the invention and its specific operation will be described in some detail.

A stream of hot solid particles from a heater, burner, or the like is fed through an inlet 11 into a reactor 13. The latter is shown in the drawing as an elongated conduit or transfer line of a more or less rectilinear initial section 14 and a spiral terminal section 17. The solid particles are preheated to a suitable temperature, somewhere within the range of 1100-1600° F. Where chemicals such as ethylene and its homologues are the desired product, the temperature of the solid particles should be above 1300° F. Thus a temperature range for the solids between 1300 and 1500° F. is usually preferred.

A suitable oil such as reduced crude, preferably preheated to a temperature of 400-700° F. or thereabouts, is introduced into the reactor line 13, preferably as a spray, through a line 15. Here the oil is contacted with the hot solid particles. It is desirable to so distribute the feed as to coat each particle as uniformly as is practicable. The solid particles employed are preferably coke particles of a size range within the approximate limits of 40-400 microns, average particle diameter. However, materials other than coke may be used such as sand, beads, metal shot and the like. Coke is preferred because it is a product of the process. In addition, it has good heat capacity and it can be reheated or regenerated simply by introducing a stream of oxygen or air into a burning zone, along with the coke. Other solids, which become sufficiently coated with coke, can of course be heated in this manner, but coke is not subject to some of their limitations.

The reactor 13 is of such length and the velocity of the stream of solid particles and oil is such that the desired contact time is provided between the hot solids and the oil by the time they reach a separation point. Since the preferred contact time is between 0.1 and 2 seconds, as indicated above, the hot solid particles should be carried completely through the reactor 13, including the first section of the spiral separating section 17 within this period so that the primary reaction products can be separated immediately.

As shown in the drawing the primary or initial separation is accomplished by means of the curved or spiral conduit per se. The spiral conduit 17, as shown, is formed around a generally vertical axis and makes about 2.5 complete turns. The embodiment in the drawing runs downwardly, which has the advantage of adding the accelerative force of gravity to the propulsion of the solid particles. However, it may run upwardly if desired. The extent or length of the path or rotation about the axis should be at least about one complete turn and preferably not more than about three turns although this will depend upon its internal diameter, its radius of curvature and of course upon the velocity of the materials passed through it and the type of materials involved.

As shown in the drawing, the spiral conduit 17 may be and preferably is of about the same diameter as the reactor but it may be somewhat smaller. In any case it should form an extension of the reactor since the conversion reaction continues therein.

Due to centrifugal force the solid particles are largely thrown against the peripheral wall of the spiral conduit and one or more withdrawal lines 19 are provided for taking out the primary products along the inside of the spiral path, with relatively minor entrainment of solids. As shown, a multibranched outlet 19 draws off the primary product in a direction generally toward the axis of the spiral path. In some cases the products may be drawn somewhat upwardly rather than downwardly, if desired. This will be found to be desirable whenever entrainment of solid particles in the primary product stream is reduced by such an arrangement. The products withdrawn are promptly quenched, e. g. by a spray of cool product at 20.

As noted above, the curved path continues on beyond the point or points where the primary products are withdrawn. Some of the gases and vapors in conduit 17 continue to accompany the solid particles downwardly along the spiral. Due to their momentum, they generally flow more or less against its exterior wall but they are not confined to that region. A stripping agent such as steam at or near the temperature of the solids is introduced into the exterior portion of this conduit through a line 21. The stripping agent may be cooler, to assist in quenching where high thermal efficiency is not too important. Instead of steam, inert gases or hydrocarbon vapors may be used for stripping and/or quenching. Liquids and even solids may be introduced through line 21 for additional quenching, where it is not necessary or desirable to keep the solids at high temperature. As a rule, however, it is not desirable to quench the coke or other solids in the system, since these would have to be reheated.

When quenching is not done in the line 17, the products should be quenched immediately after they are taken out as at outlets 19, etc.

The steam or other stripping agent introduced at 21 not only strips the solid particles of adsorbed products but also may modify the gases and vapors themselves. Moreover, if the stripping agent includes a quenching liquid, the latter may be completely evaporated in the quenching process. In any case it is usually desirable to withdraw secondary products after stripping, and an outlet, which may be singular or manifold, is provided on the inside of the spiral and directed toward its axis as indicated at 22. Here again it may be desirable to withdraw the secondary product in a somewhat upward direction rather than downward to minimize entrainment of solids. The products withdrawn downward are quenched immediately by conventional means, such as an injected spray of cooled secondary products as at 23.

From the point or points where the secondary products are withdrawn, the solid particles, with a minor quantity of entrained or adsorbed gas or vapor are passed on to a conventional separator in the form of a cyclone 25. Additional stripping inlets and withdrawal outlets may be provided if desired. A second stripping inlet is shown at 24. The residual gaseous or vaporous products are withdrawn overhead from cyclone 25 through a line 27 and quenched at 28. The solid particles, now spent, are passed downwardly through the cyclone outlet 29. From here they may be returned to a heater or burner of conventional type, not shown. They may subsequently be recycled to the reactor inlet 11.

The proportion of hot solids to oil feed should be adjusted so as to maintain the desired temperature within the reactor. For producing chemicals from heavy residua, a temperature in the reactor of 1300 to 1450° F. is particularly desirable. In some cases reaction temperatures may be as low as 900° F. and as high as 1500° F. To maintain such temperatures by the heat of the solid particles introduced into the reactor the weight of solids introduced per unit of time should be from 3 to 20 or more times the weight of the oil fed in the same unit of time.

This process has particular utility in the production of ethylene and other $C_2$ to $C_4$ olefins where it is desired to minimize dilution with hydrogen. These olefins and hydrogen form at different rates and can be concentrated, relatively speaking, in different side streams by the staged separation described above.

Although the invention has been described particularly with reference to the production of chemicals, particularly olefins, diolefins, etc., by coking it will be understood that it is applicable to other analogous reactions and conversion operations. Although quenching by spraying into the vapor stream a condensed liquid of the same general composition is usually preferred, the quenching may be accomplished by heat exchange, by injecting water or other relatively miscible or immiscible material, or by feeding in a stream of cooled relatively non-absorbent or adsorbent solids, etc. Immediate quenching of the withdrawn products is usually more important than the manner of quenching. As noted above, quenching should reduce the temperature of the product by at least 100° F., and it is desirable to quench the more active products by at least 150 to 250° F. or even more.

The apparatus which obviously may be used for other and related purposes or processes may be modified to meet varying requirements. It will be understood that the term "spiral" is used broadly to include any non-planar curved paths where there is progression along the axis of curvature. Thus the term is intended to cover helices, and various forms which are analogous to spirals, though not strict spirals in the mathematical sense. A plane curved path may be used in some cases.

What is claimed is:

1. The process of converting heavy hydrocarbon oils to low molecular weight products which comprises contacting the oil with hot mobile solid particles for a period of 0.05 to 2 seconds to convert said oil, passing a stream of said particles together with gasiform conversion products at high velocity through a curvilinear path so as to substantially separate said solids from said gasiform products by centrifugal force, withdrawing a portion of the gasiform products laterally from an early portion of said path and generally toward the center of curvature thereof at sufficiently low velocity to minimize entrainment of said solids in the withdrawn portion, immediately quenching said products by cooling at least 100° F., introducing a stripping fluid into the stream of said solids after said withdrawal, and subsequently likewise withdrawing more fully reacted products laterally from said path.

2. Process according to claim 1 wherein a quenching agent is introduced for stripping.

3. Process according to claim 1 wherein a fluid stripping agent is introduced into said path a plurality of times, alternating with the withdrawals.

4. Process according to claim 1 wherein a primary product is withdrawn and quenched, a stripping agent is introduced to strip the solids separated therefrom, a secondary product is withdrawn and quenched, and the solids are further stripped to obtain a tertiary product.

5. The process of converting heavy hydrocarbon oils to reactive low molecular weight products, which comprises feeding a stream of hot particulate solids at a temperature of 1100 to 1600° F. through an elongated conduit including a curvilinear section at a velocity such as to pass through said conduit in 0.05 to about 2 seconds, feeding a preheated heavy oil into said conduit at such a rate that it is substantially fully vaporized and largely converted to the desired products by contact with said solids while in said conduit, passing the products, with said solids entrained therein, through said curvilinear section of at least one complete loop at such a velocity as to substantially separate said solids by centrifugal force, laterally withdrawing a primary reaction product, substantially free of solids, toward the center of curvature of said curvilinear path in an early portion of said path, immediately quenching the withdrawn products by cooling them at least 100 to 250° F., introducing a stripping fluid into a later portion of said curvilinear path to strip said solids of entrained vapors, and finally separating the stripped products from said solids by withdrawing the product vapors laterally toward the center of curvature of said path.

6. Process according to claim 5 wherein the curvilinear path is a spiral path.

7. Process according to claim 5 wherein the quenching fluid is a liquid hydrocarbon oil.

8. Process according to claim 5 wherein the first withdrawn portion of reaction products comprises a substantial proportion of $C_2$ to $C_4$ olefins and a comparatively low proportion of hydrogen.

9. Apparatus for separating highly reactive chemicals in vapor phase from entrained hot solid particles which comprises a generally spiral conduit for said chemicals and particles making a plurality of complete turns about a relatively vertical axis, means for feeding said chemicals and entrained solids through said conduit at sufficiently high velocity to substantially separate said solids to the outer periphery of said conduit by centrifugal force, a first lateral withdrawal line connected to an inner portion of said conduit relatively near the inlet of said conduit for withdrawing a primary portion of said vapor phase chemicals toward the spiral axis from said conduit, a stripping agent inlet line connected to the outer periphery of said conduit after the first complete turn and a second lateral withdrawal line connected to an inner portion of said conduit more remote from said inlets to withdraw separately a secondary portion of said chemicals toward the axis of the spiral.

10. Apparatus according to claim 9 wherein the spiral conduit is connected to a cyclone for subsequent and further separation of solid particles.

11. Apparatus according to claim 10 wherein the axis of the spiral is substantially vertical and the materials in the conduit flow downwardly.

12. Process according to claim 5 wherein the curvilinear path moves downwardly about a generally vertical axis to accelerate the flow of solids by gravity.

13. The process of coking residual hydrocarbon oils at high temperatures to produce unsaturated hydrocarbon products of low molecular weight, which comprises feeding a stream of coke particles of 40 to 400 microns average diameter and at a temperature between 1100 and 1600° F. in contact for a period of from 0.05 to 2 seconds with residual oil to be converted through a confined path comprising a relatively linear initial section and a subsequent curvilinear section of at least one complete revolution about a center in extent, at such a velocity as to cause substantial separation of said coke from vaporous conversion products in said curvilinear section, withdrawing a primary stream of said vaporous conversion products, high in unsaturates content, generally toward the center of curvature of said path without substantial entrainment of said coke particles, quenching the primary products to cool them at least 100° F. and thereby inhibit thermal degradation, injecting steam into said curvilinear path to strip the occluded and/or adsorbed products from said coke particles and to accelerate said particles further along said curvilinear path, and withdrawing a secondary stream of products, relatively higher in hydrogen than said first stream, laterally and generally toward the center of curvature of said path.

14. Process according to claim 13 wherein the coke particles are reheated and recycled.

15. Process according to claim 13 wherein said unsaturates are predominantly ethylene.

References Cited in the file of this patent

UNITED STATES PATENTS

| | | |
|---|---|---|
| 532,144 | Day | Jan. 8, 1895 |
| 1,875,755 | Noyes | Sept. 6, 1932 |
| 2,138,143 | Dodge | Nov. 29, 1938 |
| 2,193,460 | Loumiet et al. | Mar. 12, 1940 |